United States Patent
Ganapathi et al.

(10) Patent No.: US 11,233,704 B2
(45) Date of Patent: Jan. 25, 2022

(54) MACHINE LEARNING BASED END TO END SYSTEM FOR TCP OPTIMIZATION

(71) Applicant: salesforce.com, inc., San Francisco, CA (US)

(72) Inventors: Tejaswini Ganapathi, San Francisco, CA (US); Satish Raghunath, Sunnyvale, CA (US); Shauli Gal, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 72 days.

(21) Appl. No.: 16/775,807

(22) Filed: Jan. 29, 2020

(65) Prior Publication Data

US 2021/0234769 A1    Jul. 29, 2021

(51) Int. Cl.
*H04L 12/24* (2006.01)
*H04L 12/819* (2013.01)
*H04L 12/26* (2006.01)

(52) U.S. Cl.
CPC ............ *H04L 41/16* (2013.01); *H04L 41/142* (2013.01); *H04L 43/062* (2013.01); *H04L 47/21* (2013.01)

(58) Field of Classification Search
CPC ....................................................... H04L 41/16
See application file for complete search history.

(56) References Cited

U.S. PATENT DOCUMENTS

| | | |
|---|---|---|
| 2012/0066357 A1 | 3/2012 | McFate et al. |
| 2017/0261949 A1 | 9/2017 | Hoffmann et al. |
| 2018/0287907 A1 | 10/2018 | Kulshreshtha et al. |
| 2018/0331908 A1 | 11/2018 | Gal et al. |
| 2019/0138362 A1* | 5/2019 | Ganapathi ............. H04L 41/142 |
| 2019/0140910 A1* | 5/2019 | Ganapathi ............... H04L 43/08 |
| 2019/0141113 A1* | 5/2019 | Ganapathi ............. G06N 5/003 |
| 2019/0141549 A1* | 5/2019 | Ganapathi ............... G06F 30/00 |
| 2019/0245873 A1 | 8/2019 | Wu et al. |
| 2021/0234782 A1 | 7/2021 | Ganapathi et al. |

OTHER PUBLICATIONS

United States Patent and Trademark Office, U.S. Appl. No. 16/775,819, Non-Final Office Action dated Jun. 30, 2021.

* cited by examiner

*Primary Examiner* — Kodzovi Acolatse
*Assistant Examiner* — Abdeltif Ajid
(74) *Attorney, Agent, or Firm* — Wong & Rees LLP; Zhichong Gu

(57) ABSTRACT

Bypass network traffic records are generated for a web application. Sufficient statistics of network optimization parameters are calculated for network performance categories. The bypass network traffic records are partitioned for the network performance categories into network traffic buckets. Sufficient statistics and the network traffic buckets are used to generate network quality mappings. The network quality mappings are used as training instances to train a machine learner for generating network optimization policies to be implemented by user devices.

21 Claims, 11 Drawing Sheets

```
from: (geo: us-west-1,
       app: xyz-app-1,
       access_rtt_interval: [50, 150],
       source_ip_prefix: xyz.fha.frv.*,     ASN: x
    },
then:
{
    strategies:
    {
    "network_quality_good":
    {
    maximum burst size: ...,
    connections: ...,
    weight: w_good
    },
    "network_quality_OK":
    {
    maximum burst size: ...,
    connections: ...,
    weight: w_PK
    },
    ....
    }
}
```

FIG. 3C given network quality category and vector of sufficient statistics 422 sample specific values of network optimization parameters 424 simulate network requests with the specific values 426 synthetic network traffic data 428

MACHINE LEARNING BASED END TO END SYSTEM FOR TCP OPTIMIZATION

CROSS-REFERENCE TO RELATED APPLICATIONS

This application is related to U.S. patent application Ser. No. 16/775,819, filed on Jan. 29, 2020, titled "ESTIMATION OF NETWORK QUALITY METRICS FROM NETWORK REQUEST DATA," by Tejaswini Ganapathi, Shauli Gal, Satish Raghunath and Kartikeya Chandrayana, filed on equal day, the contents of all of which are incorporated herein by reference in their entireties.

TECHNOLOGY

The present invention relates generally to optimizing content delivery, and in particular, to machine learning based end to end system for network or TCP optimization.

BACKGROUND

Access service networks are very volatile and diverse. Link conditions may vary in different access service networks and different locations. Metrics such as latency, jitter, throughput, and losses are hard to bound or predict. The diversity comes from the various network technologies, domain name services, plethora of devices, platforms, and operating systems in use at the various locations of the access service networks.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Numerous parameters may be used in TCP to help in ordered data transfer, retransmission of lost packets, error-free data transfer, flow control, and congestion control. However, identifying an optimal data value for a single TCP parameter based on changing network characteristics remains a challenge.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3C illustrates an example network optimization policy;

DESCRIPTION OF EXAMPLE EMBODIMENTS

Figure 1A:
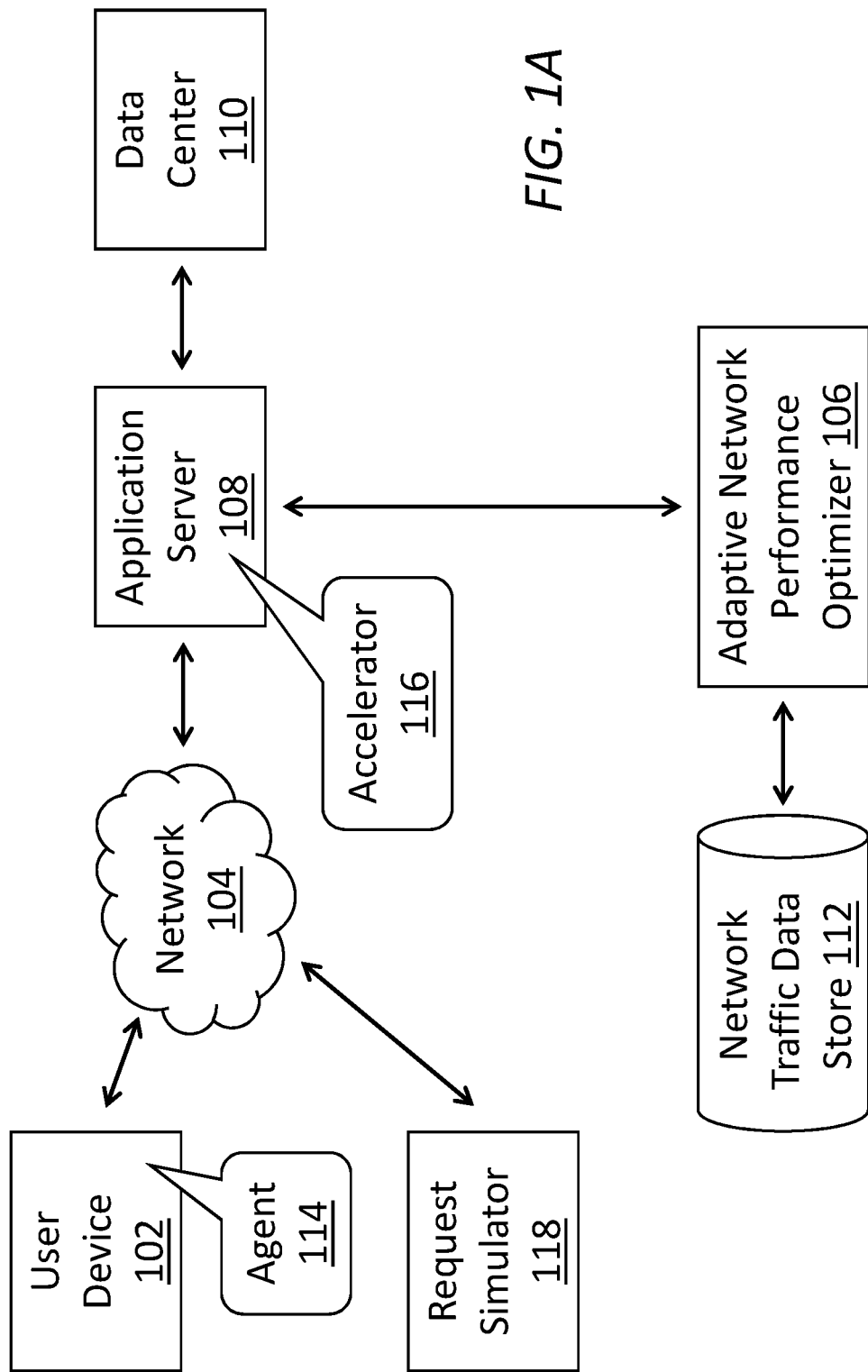
FIG. 1A illustrates a high-level block diagram for a network performance optimization system.

Example embodiments, which relate to machine learning based end to end system for network or TCP optimization, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. NETWORK TRAFFIC DATA AND PERFORMANCE OPTIMIZATION
3. NETWORK QUALITY CATEGORIES
4. SUFFICIENT STATISTICS
5. NETWORK QUALITY MONITORING AND OPTIMIZATION
6. SYNTHETIC TRAFFIC DATA GENERATION
7. EXAMPLE NETWORK OPTIMIZER
8. ESTIMATING NETWORK QUALITY CATEGORIES
9. DRIVING NETWORK OPTIMIZATION
10. EXAMPLE EMBODIMENTS
11. IMPLEMENTATION MECHANISMS - HARDWARE OVERVIEW
12. EQUIVALENTS, EXTENSIONS, ALTERNATIVES AND MISCELLANEOUS

1. GENERAL OVERVIEW

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include wired networks, cellular networks (e.g., LTE, HSPA, 3G, older technologies, etc.), WiFi (e.g., 802.11xx series of standards, etc.), satellite, microwave, etc. In terms of devices and software, there are smartphones, tablets, personal computers, network-connected appliances, electronics, etc., that rely on a range of embedded software systems such as Windows, Apple iOS, Google Android, Linux, and several other specialized operating systems.

Many of these network technologies feature a volatile wireless last mile. The volatility manifests itself in the application layer in the form of variable bandwidth, latency, jitter, loss rates and other network related impairments. The diversity in devices, operating system software and form factors result in a unique challenge from the perspective of user experience. The nature of content that is generated and consumed on these devices is quite diverse. The new content is very dynamic and personalized.

A consequence of these characteristics is that end-users and applications experience inconsistent and poor performance client and server software systems may be best deployed in a stable operating environment where operational parameters either change a little or do not change at all. When such software systems see unusual network feedback or interaction, they tend to over-react in terms of remedies.

To maximize improvement in throughput gain and download complete time, network or TCP parameters may be estimated using a data driven approach by analyzing prior network traffic data without assuming any stationarity of network performance/quality and/o without assuming any stationarity of probability distributions for each of the quantities used in network optimization as estimated/predicted/determined by a network optimizer as described herein. Because computer networks may be volatile and non-stationary (i.e., statistics change with time), estimating network or TCP parameters as described herein can be adaptive and/or dynamically performed to capture volatilities in the networks, but also stable and not overly sensitive to short term fluctuations.

In many operational scenarios, prior network traffic data collected for monitoring and optimizing network performance may not contain information about access service network technology used by user devices and locations of the user devices. For example, application servers for web applications may receive web messages such as HTTP messages with standard headers devoid of access service network technology information from user devices accessing the web applications from web browsers. In addition, application servers for web applications may interact with user devices such as desktop computers and other non-cellular devices that are not able to provide location information about where network requests are originated. A network request as described herein may refer to a data request for retrieving or downloading one or more data objects from one or more servers located remotely across one or more networks. Example network requests may include, but are not necessarily limited to only, any of: HTTP requests, RESTful API calls, XML HTTP requests, application programming interface (API) calls, etc.

As used herein, a web application may refer to a cloud-based computer application that is hosted in one or more cloud-based networks of a provider such as a multi-tenant hosting system that are different from access service networks directly interfacing with user devices. In many operational scenarios, the access service networks (e.g., WiFi, cellular, DSP, optical, copper wired, access service satellite communications, etc.) and the one or more cloud-based networks of the provider of the web application may be interconnected through zero, one or more of core networks, direct network conduits, and so forth. The web application can be accessed and used by the user devices by way of the access service networks and one or more application services located at (e.g., edges of, endpoints of web servers in, etc.) the one or more cloud-based networks of the provider. In some operational scenarios, the provider of the web application may deploy multiple web applications such as sales, marketing, reporting, training, etc., that can be similarly accessed and used by user devices by way of application servers operating in conjunction with backend servers and databases deployed with the one or more cloud-based networks.

Techniques as described herein can be used to provide a network optimization solution, including but not limited to an end-to-end machine learning solution, to optimize network or TCP parameters such as congestion control, concurrency parameters, and the like, to maximize improvements in download outcomes and/or page loading performances in connection with user devices accessing web applications. These techniques may make use of, but do not depend on, (1) information/metadata on access (service) network technology used in access (service) networks and (2) location context/information of the user devices and/or the access service networks.

An access service network (or access network for simplicity) may refer to any network that directly interface with a user device as described herein or with a network device such as router, modem, etc., collocated and connected with the user device. Example access service networks may include, but are not necessarily limited to only, any, some or all of: WiFi networks, cellular network, wired access networks, satellite enabled access networks, networks having their service areas physically covering user devices and/or network devices collocated and connected with the user devices, networks providing (e.g., initial, etc.) network access to user devices and/or network devices collocated and connected with the user devices, etc.

The techniques as described herein can be beneficially used or implemented with a wide variety of network (performance) optimizers implementing a wide variety of network optimization methods to optimize end user experience through faster page loads and download outcomes in connection with web pages provided on web browsers, whether the web browsers run on mobile devices, desktops, or other types of computing devices. These techniques are agnostic to types of network optimization systems and can work with any such systems to add or enrich collected traffic data information with network quality information for the purpose of evaluating, monitoring and/or improving network quality.

In some operational scenarios, even with access to information carried in data packets or HTTP messages, a network optimizer may not be able to access or gather contextual information for the access service networks (e.g., 3/4/5G or WiFi technologies, specific carriers providing the access service networks, etc.), geographic and time zones and/or locations of the user devices or the access service networks, etc.

Under techniques as described herein, a network optimizer may be implemented as a data driven system that can improve network experience of end users with no or minimal contextual information (e.g., about the access service networks, the time zones of the user devices and/or the access service networks, the locations of the user devices and/or the access service networks, etc.). The system can be implemented to adaptively respond to changes in network quality and congestion over time and estimate optimized values for network or TCP parameters to be used by user devices and/or servers to improve page load performance and download outcomes over what is currently achieved with default network or TCP parameters without optimization.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. NETWORK TRAFFIC DATA AND PERFORMANCE OPTIMIZATION

The network performance of data delivery for user devices to send network requests to web applications and receive data downloads corresponding to the network requests is closely tied to network conditions with which the user devices, application servers and other involved devices are operating. A network optimizer as described herein dynamically adapts to these conditions and picks the best network optimization policies/strategies based on network performance datasets (e.g., page load performance data, download outcomes, sufficient statistics of parameters related to network performance, performance quality mappings, training instances, etc.) generated from network traffic data collected over a series of time windows for web applications that communicates with user devices and/or network request simulators from different access (service) networks by way of application servers located at different geographic and time zone locations.

Techniques as described herein can be implemented without reliance on collecting or capturing some or all information about specific contexts in which network requests and/or associated data downloads are made. As used herein, network requests generated by network request origination devices such as user devices and/or network request simulators may refer to any of: network download requests, data transfer requests, requests to download data, requests to download data objects, request to load web pages, etc.

The network optimizer may be implemented to recommend, but is not limited to, any combination of: end-device based data delivery strategies and accelerator-based data delivery strategies. The network optimizer may perform some or all of its operations without (capturing or receiving) information about some or all specific operating contexts in which some or all of the network requests giving rise to the network performance datasets were made. However, if information about some or all specific operating contexts in which some or all of the network requests giving rise to network performance datasets were made is available, the network optimizer may operate to make use or take advantage of such information.

Network optimization policies or strategies refer to methods and/or operational parameters (e.g., network or TCP parameters, etc.) deployed or implemented by a network request origination device such as a user device and/or a network request simulator to request, receive or, transmit data or data object(s) over the network. These network optimization policies or strategies include, but are not limited to, any combination of: optimized values of one or more network or TCP parameters to propagate to network request origination devices and/or network request processing devices for implementation on the network request origination devices and/or the network request processing devices to be used in future network requests and future data downloads corresponding to the future network requests.

A range of network or TCP parameters determines and influences the performance of tasks such as data delivery in connection with network requests and/or data downloads. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304395, entitled "Cognitive Data Delivery Optimizing System," filed Nov. 12, 2013, and which is hereby incorporated by reference in its entirety for all purposes. Embodiments are not tied down by assumptions on the current nature of the system. A network optimizer 106 may use raw network traffic data to generate a network performance dataset and use the network performance dataset to generate network optimization policies or strategies as described herein.

FIG. 1A and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1A in order to simplify and clarify the description.

As illustrated in FIG. 1A, a system 100 includes a user device 102 that communicates data requests through a network 104. In some operational scenarios, system 100 includes a network request simulator 118 that communicates simulated data requests through network 104. An application server 108 may receive the data requests—as originated from user devices and/or network request simulators over network 104—and communicate the requests to a data center 110.

Example application servers may include but are not necessarily limited to only, any of: web servers with service end points and service logic to further invoke backend application, database and/or platform services, application servers operating in conjunction with web servers and backend servers, application servers handling bypass traffic and/or accelerated traffic, proxy servers acting as proxies for some or all of application servers and/or backend servers, and so forth. The network optimizer 106 may gather network traffic data from the application server 108 and store the network traffic data in the network data traffic store 112, in an embodiment.

Example network traffic data may include, but is not necessarily limited to only, network traffic data of data values used with network requests made by network request origination devices, page load data or performance measurements of web/application page loadings on the network request origination devices, download outcomes or performance data of data (object) downloads initiated by the network requests, etc.

Network traffic may refer to network requests sent by user devices and/or network request simulators to application servers and/or data (object) downloads, as requested by the network requests, from the application servers to the user devices and/or the network request simulators.

To track or validate results of network optimization policies/strategies, network requests may be divided and flagged into two network request types. The first network request type is accelerated network requests (and their corresponding data downloads) optimized with at least one network optimization policy/strategy produced by a network optimization system as described herein. The second network request type is bypass network requests (and their corresponding data downloads) transmitted directly between network request origination servers accessing computer applications and application servers (or origin servers) implementing the computer applications. As used herein, an origin server may represent a server that (1) implements a web-based computer application/service and/or provides/generates original data or data objects requested by user devices and/or (2) provides original content that may be cached and served out on behalf of the origin server to user devices by a content delivery network (CDN).

Thus, a subset of network traffic may be bypass network traffic performed with default TCP parameters; corresponding network request data including but not limited to performance data of the subset of network traffic may be stored in the network data traffic store 112 as bypass traffic data. In some operational scenarios, the bypass network traffic may refer to network traffic generated by network requests and/or data downloads transmitted directly between origin servers and user devices without network optimization and/or without going through network accelerators implementing network optimization policies/strategies as described herein.

Accelerated network traffic may refer to accelerated network requests and/or accelerated data (object) downloads, which are performed with assigned optimized values of network or TCP parameters generated or propagated from a network optimizer or a network optimization engine as described herein. Corresponding network traffic data of the accelerated network traffic may be collected, processed and/or stored in the network data traffic store 112 as accelerated traffic data.

After or concurrently while a page load or data download (e.g., with respect to each data object of a web page, with respect to a group of data objects, etc.) is processed and/or completed, statistics of data sizes, times, etc., may be logged as raw network traffic data comprising database records representing raw traffic data records. Each raw traffic data record may include performance metrics derived from or recorded in the statistics. In an example, page load (performance) data such as some or all of page load throughputs, page load complete times, and page load times to first byte, etc., may be captured in each database record representing a raw traffic data record in the network data traffic store 112 for each network request and/or for a web page corresponding to the network request. In another example, download outcomes such as some or all of download throughputs, download complete times, and download times to first byte, etc., may be captured in each database record representing a raw traffic data record in the network data traffic store 112 for each network request or data downloads corresponding to each such network request.

Additionally, optionally or alternatively, performance metrics such as percentage improvement in throughput and download complete time of accelerated network requests with optimized values of network or TCP parameters as compared with those of bypass traffic network requests may also be stored in raw traffic data records and/or subsequent processed/aggregated traffic data records in the network data traffic store 112, in one embodiment.

In some operational scenarios, additional information may also be included in each database record or network traffic data record, in other embodiments. Typical sources of data relating to the network environment are elements in the network infrastructure that gather statistics about transit traffic as well as user devices and/or network request simulators that connect to the network as clients or servers. The additional information includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, the network request simulator 118 may be installed on a (e.g., a dedicated, a multi-purposed, etc.) test computing device, which may be separate from a user device—e.g., actually operated by a user of a computer application as described herein—such as 102 of FIG. 1A.

In an embodiment, a module/component such as an agent 114 may be installed in a network request origination device such as the user device 102 and/or the network request simulator 118 to provide inputs about the real-time operating conditions, participates and performs active network measurements, and executes recommended strategies with actual or synthetic network requests. The agent 114 may be supplied in a software development kit (SDK) and installed on the user device 102 and/or the network request simulator 118 when an application that includes the SDK is installed on the user device 102.

Additionally, optionally or alternatively, in an embodiment, the network request simulator 118 may be supplied in the software development kit (SDK) and installed on the user device 102. For example, in some operational scenarios, the network request simulator 118 may be collocated with the user device 102 as a part of the agent 114.

By incorporating an agent 114 in or with the network request origination device to report the observed networking conditions back to the accelerator 116, estimates about the state of the network can be vastly improved. The main benefits of having a presence (the agent 114) in or with the network request origination device such as the user device 102 and/or the network request simulator 118 include the ability to perform measurements that characterize one leg of the session, e.g., measuring just the client-to-server leg latency, etc.

An accelerator 116 sits in the path of the data traffic operating with an application server 108 and executes recommended strategies in addition to gathering and measuring network-related information in real-time. The accelerator 116 may propagate network optimization policies (which, unless specified otherwise, may interchangeably refer to network optimization strategies herein) from the network optimizer 106 to the application server 108, in one embodiment. In another embodiment, the agent 114 may implement one or more network optimization policies from the network optimizer 106.

For example, the optimal number of simultaneous network connections may be propagated as a network optimization policy from the network optimizer 106 through the network 104 to the agent 114 embedded on or with the user device 102 and/or the network request simulator 118. As another example, the transmission rate of file transfer may be limited to 20 MB/sec by the accelerator 116 as a network optimization policy propagated by the network optimizer 106 based on machine learning (e.g., unsupervised learning, supervised learning, etc.) and performance metrics.

Here, the term "supervised learning" may refer to providing to and training a learning machine (or machine learner) with, datasets comprising labels or ground truth indicating desired outputs as labeled. An example dataset used by supervised learning as described herein is a network performance dataset having network quality mappings comprising respective labels or ground truth (e.g., estimated/determined by unsupervised learning, etc.) indicating respective traffic shares in the network quality mappings as "good", "ok" or "bad" network quality categories.

In contrast, the term "unsupervised learning" may refer to learning structures/features from, datasets comprising no labels or ground truth indicating desired outputs. An example of unsupervised learning may be, but is not necessarily limited to only: automatically clustering data in the datasets into classes, categories, bands of different characteristics or features. An example dataset used by unsupervised learning as described herein is network traffic data (e.g., page load performance data, download outcomes, etc.) without some or all contextual information about access service networks (e.g., a "good" network such as a 5G network, an "ok" network such as a 4G network, a "bad" network such as a 3G or 2G network, etc.) or geographic and/or time zone locations (e.g., in a modern company office with good network service coverage, in an area with poor network coverage, etc.) of network request origination devices.

The raw network traffic data may be aggregated or processed into (e.g., aggregated, processed, etc.) network traffic data comprising aggregated rows or database records (or traffic data records). For example, once a multitude of raw network traffic data associated with data requests between network request origination devices such as user devices 102 and/or network request simulators 118 and the data centers 110 are logged in the network data traffic store 112, it becomes possible to filter, classify, cluster, partition, group and/or aggregate this data by unique combinations of some or all of network quality category. For example, the network quality categories may be generated with unsupervised learning or automatic clustering algorithms.

In some operational scenarios, aggregated rows such as database records or network traffic data records for a network quality category may be partitioned into different data segments respectively corresponding to different combinations of computer applications (e.g., individual computer applications, individual computer application types, individual computer application names, individual application identifiers, etc.), application servers (e.g., individual application servers serving network requests, etc.), time blocks (e.g., ordered time windows, consecutive time windows, fixed time windows, fixed 24-hours intervals, fixed two-hour intervals, non-fixed time windows, 1-hour time windows in busy hours, 3-hour time windows in non-busy hours, etc.), and so forth.

Filtering, classifying, clustering, partitioning, grouping and/or aggregating of the raw network traffic data by time block/window as described herein may record (e.g., individual, network request specific, collective, network request non-specific, moving average over a time interval, etc.) network request data, page load data, download outcomes, traffic shares, etc. In some operational scenarios, for accelerated traffic, each aggregated row representing an accelerated network traffic portion also records performance improvement metrics such as percentage improvement in comparison with the bypass traffic in page load performance, data download performance, etc.

3. NETWORK QUALITY CATEGORIES

Techniques as described herein can be implemented to dynamically identify categories of network quality from network traffic data. The categories of network quality may be referred to, unless otherwise specified, as network quality/performance categories, network quality/performance bands, network quality/performance clusters, etc. As used herein, network quality or network performance may refer to quality or performance of one or more networks (e.g., 104 of FIG. 1A, etc.) through which user devices and/or network request simulators send network requests for download data objects and receive data (object) downloads as requested as measured through page load data, download outcomes, etc., with dependence on receiving contextual information about underlying access service networks (or types thereof) whose service areas physically cover the user devices and about geographic locations of the user devices and/or the access service networks.

Network request data may include, but are not necessarily limited to only, some or all of: data fields used in network requests, operational parameters carried in the network requests, performance data collected for the network requests, operational parameters used in user devices and/or servers for the network requests, etc. Page load data may include, but is not necessarily limited to only, some or all of: times taken for individual web pages to fully load in browsers after links to the web pages have been selected or clicked, time taken for individual data objects of web pages to be downloaded, time taken for processing downloaded data objects (including but not limited to scripts, browser-executable computing instructions, etc.) by browsers, etc. Download outcomes may include, but are not necessarily limited to only, some or all measurements of throughput, time to first byte, and download complete time for individual downloads, etc.

Figure 1B:
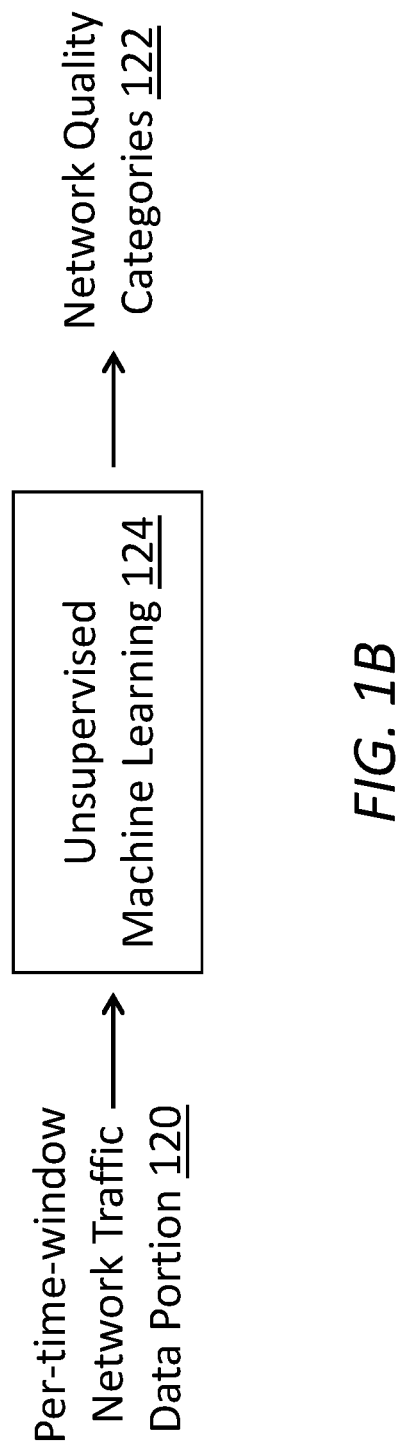
FIG. 1B illustrates example discovery, identification and/or generation of network quality categories from network traffic data through unsupervised machine learning.

FIG. 1B illustrates example discovery, identification and/or generation of network quality categories 122 from network traffic data through unsupervised machine learning 124 implemented with one or more computing devices such as a network optimizer, a network optimization system, a network optimization engine, etc.

The network traffic data may comprise time series data represented as a time series of individual per-time-window network traffic data portions. For example, a total time period over which the network traffic data is collected for adaptive network performance optimization may be partitioned or accumulated into a series of consecutive (e.g., mutually exclusive, partly overlapped, etc.) time windows. Correspondingly, the network traffic data may be partitioned or accumulated into a series of consecutive (e.g., mutually exclusive, partly overlapped, etc.) per-time-window network traffic data portions. Each per-time-window network traffic data portion in the series of per-time-window network traffic data portions corresponds to—e.g., may be indexed by and/or may be collected/measured over—a corresponding time window in the series of time windows.

The unsupervised machine learning 124 can be performed on each per-time-window network traffic data portion (e.g., 120, etc.) in the time series to dynamically identify network quality categories 122 as represented in the underlying per-time-window network traffic data portion 120. The unsupervised machine learning 124 can be used to automatically discover, identify and/or generate performance quality clusters/categories in the network traffic data without receiving any labels or ground truth of specific performance quality categories/types to which any network requests and/or data downloads in the network traffic data belong as input. Example unsupervised machine learning algorithms/methods/procedures/operations employed in the unsupervised machine learning 124 may include, but is not necessarily limited to only, some or all of: automatic cluster analysis, automatic principal component analysis, density analysis, dimension analysis, k-means, hierarchical clustering, neural networks, autoencoders, generative adversarial networks, etc.

One or more types of performance measurements/metrics collected in the network traffic data may be used as features or to form feature vectors for applying the unsupervised machine learning 124. It should be noted that a performance metric/measurement as described herein may be numeric, discrete, composite, and/or multi-dimensional.

For example, a corresponding per-time-window network traffic data portion (e.g., 120, etc.) collected for each time window may comprise a set of database records (or a set of traffic data records) comprising a set of measurements of page load times of web pages corresponding to or taken/ measured for a set of network requests and/or data downloads for web pages or for data objects therein. Each database record in the set of database records may comprise respective measurements of page load times corresponding to or taken/measured for a respective network request (and/ or a respective data download) in the set of network requests. The set of page load times may be used as features or to form feature vectors for automatic clustering of the database records—representing underlying network requests and/or data downloads—to discover, identify and/ or generate different performance quality clusters/categories in the database records for the specific time window.

In some operational scenarios, different performance quality clusters/categories may be automatically discovered, identified and/or generated using a distance-like measure (e.g., a L2 distance measure, a magnitude measure, a sum of absolute differences, etc.) to minimize intra-cluster distances between or among features or feature vectors of different network requests and/or corresponding downloads in the same cluster and to maximize inter-cluster distances between features of network requests and/or corresponding data downloads in a performance quality cluster/category and features or feature vectors of network requests and/or corresponding data downloads in a different performance quality cluster/category.

Additionally, optionally or alternatively, instead of directly performing unsupervised machine learning on a per-time-window network traffic data portion (e.g., 120, etc.)—which comprises a set of database records representing underlying network requests and/or corresponding data downloads—as a whole, the per-time-window network traffic data portion 120 may be partitioned into one or more data segments based on one or more internal and/or external attributes of database records in the set of database records. For example, the set of database records for the time window may be partitioned into different data segments or subsets of database records based on computer application names (e.g., computer application types, implemented by platform servers of a multitenant hosting system remote from user devices, etc.), geographic locations of closest servers designated—or otherwise available—for serving or processing the underlying network requests represented in the set of database records, etc. Unsupervised machine learning (e.g., 124, etc.) as described herein may be performed individually on individual data segments or individual subsets of database records to automatically discover, identify and/or generate individual performance quality categories/clusters for each data segment or each subset of database records.

4. SUFFICIENT STATISTICS

Techniques as described herein can be further used or implemented to generate sufficient statistics for network optimization parameters for identified categories of network quality/performance, given network traffic data as input.

As used herein, network optimization parameters may refer to some or all operational parameters used in network optimization operations/algorithms/methods/procedures to generate optimized values for network parameters to be implemented by user devices and/or by servers interacting with the user devices. Example network optimization parameters may include, but are not necessarily limited to only, some or all of: sustained maximum transmit rate, maximum allowed burst, maximum latency, etc., of each identified category of network quality or performance. Example network parameters may include, but are not necessarily limited to only, some or all of: TCP parameters, maximum burst sizes, initial congesting windows, TCP congestion handling thresholds, etc.

Figure 2:
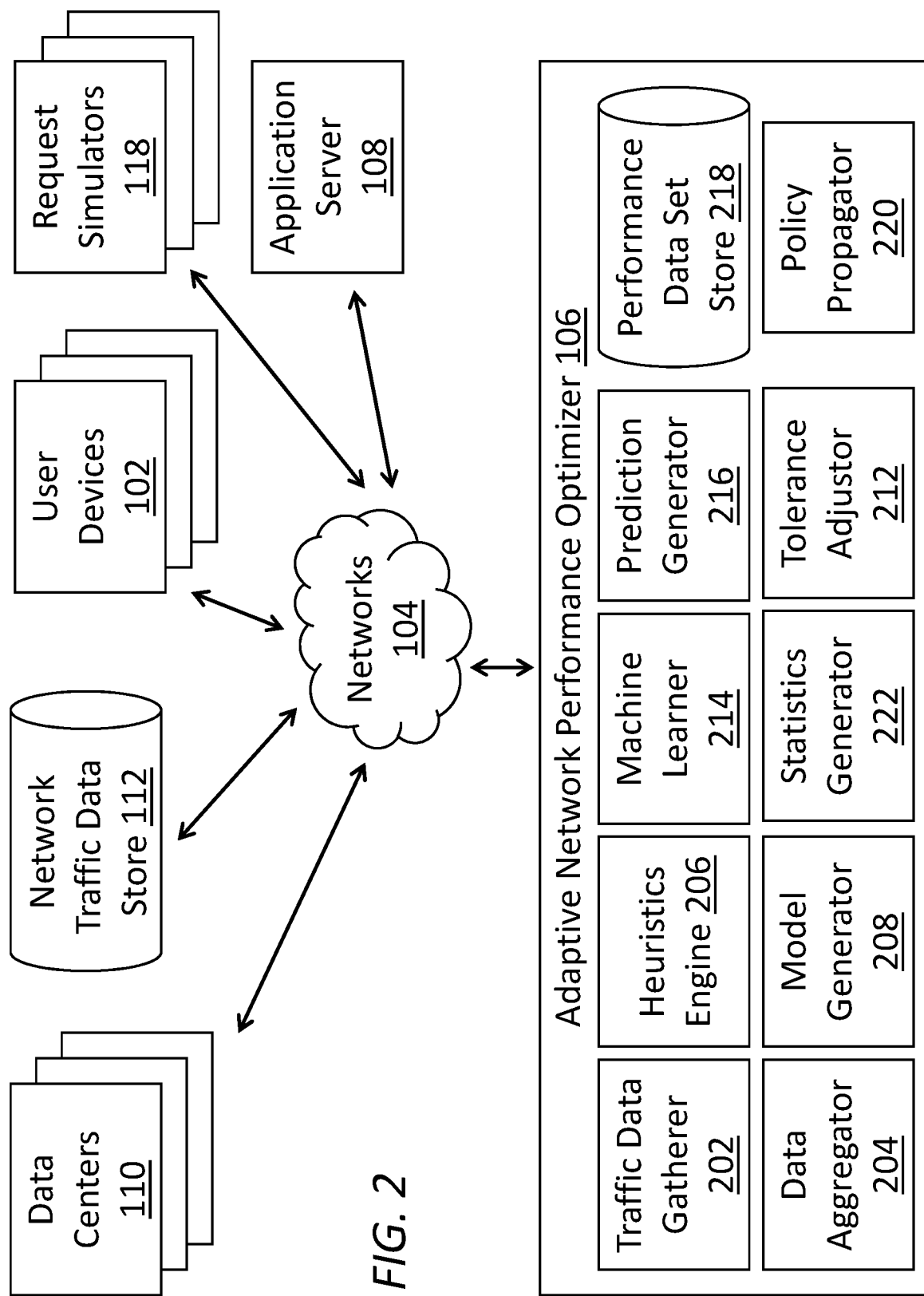
FIG. 2 illustrates an example system that includes a network optimizer.
Figure 4A:
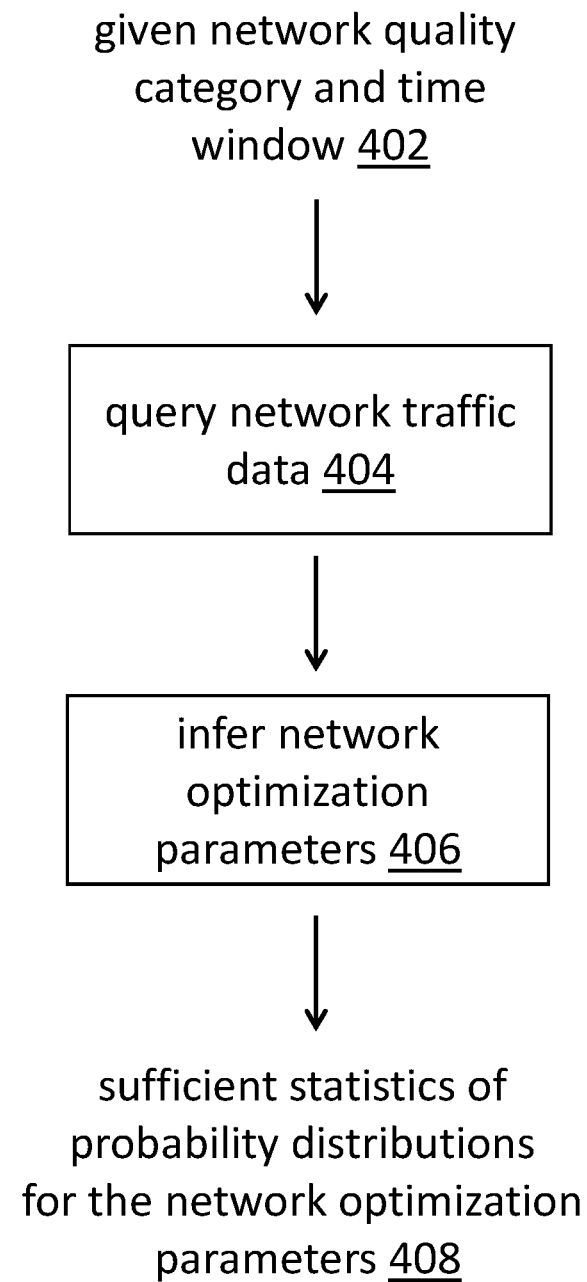
FIG. 4A through FIG. 4D illustrate example process flows.

FIG. 4A illustrates an example process flow for generating sufficient statistics of network optimization parameters given input data 402 comprising a network quality category and a time window. The performance flow may be implemented or performed by a network monitor, a performance optimizer, a performance tester, etc., implemented with one or more computing devices. In some operational scenarios, a sufficient statistics generator (e.g., 222 as illustrated in FIG. 2, etc.) may perform this process flow.

Block 404 comprises querying network traffic data based on the network quality category and the time window. Database records (or network traffic data records) corresponding to (e.g., a combination of, etc.) the network quality category and the time window may be retrieved in a query of the network traffic data store 112. The network optimization parameters may individually and/or collectively define or inform quality or performance of one or more networks (e.g., 104, etc.) for the network quality category over the time window.

Block 406 comprises inferring sufficient statistics of probability distributions for the network optimization parameters 408 from the database records corresponding to (the combination of) the network quality category and the time window. Sufficient statistics of a probability distribution for each of the network optimization parameters from the database records of the network quality category and the time window using generative models for the network optimization parameters.

By way of illustration but not limitation, the network optimization parameters or quantities may be some or all of: sustained maximum transmit rate, maximum allowed burst, and maximum latency of the network quality category and the time window as inferred or estimated from network request data, page load data, download outcomes, etc., as represented in the database records of the network quality category and the time window retrieved in the query of the network traffic data store 112.

Sufficient statistics as described herein may refer to a (e.g., marginal, etc.) probability distribution or parameters (including but not limited hyperparameters) characterizing, defining and/or specifying a probability distribution. Sufficient statistics of a network optimization parameter can be used to provide sufficient information about a (e.g., marginal, etc.) probability distribution of the network optimization parameter such that expectation value(s) and other statistics of the network optimization parameter can be derived directly from the sufficient statistics of the network optimization parameter. The sufficient statistics can be sampled or used to generate (e.g., different, in certain value range(s) or certain value sub-range(s), etc.) values of network optimization parameter(s). Page load and/or download performances/outcomes of web applications with respect to specific web pages or components/objects therein can then be checked out, estimated, predicted and/or validated with these values of the network optimization parameter(s). Because the sufficient statistics are generated based on generative models, this allows complementary synthetic traffic data to be collected for monitoring, improving and/or validating (e.g., validating the generative models, validating application improvement, validating corner/outlier cases/scenarios not necessarily covered well by the generative models, etc.) various performances of the web applications with the sampled values from the sufficient statistics before releasing the web applications or new features thereof to end users.

Example probability distributions as described herein may include, but are not necessarily limited to, any of: Gaussian probability distributions, Poisson probability distributions, Erlang distributions, gamma distributions, neural network predicted probability distributions, noiseless probability distributions, noise-injected probability distributions, etc. Some or all of the probability distributions may be characterized by specific hyperfunction parameters associated with specific functional forms to which the probability distributions belong. Once these hyperfunction parameters are derived or estimated for the probability distributions, expectation values and other statistics (e.g., mean, median, quartiles, sampled network optimization parameter values/ranges and respective traffic shares, etc.) may be derived or estimated using these hyperfunction parameters for the probability distributions.

In some operational scenarios, given a functional form for a probability distribution of a network optimization parameter, sufficient statistics for the probability distribution of the network optimization parameter may be represented by (derived or estimated values for) hyperfunction parameters associated with the probability distribution or functional form. Some example sufficient statistics may include, but are not necessarily limited to only: some or all of: mean and variance parameters for Gaussian distributions, lambda parameters for Poisson distributions, shape or rate parameters for Erlang distributions, and so forth.

As in the case of generation of performance quality categories through unsupervised machine learning, sufficient statistics (of a probabilistic distribution) of a network optimization parameter may be generated through unsupervised machine learning as well. In some operational scenarios, the sufficient statistics of the probabilistic distribution of the network optimization parameter can be inferred, estimated and/or generated through unsupervised machine learning using a generative model.

In some operational scenarios, a specific functional form type (e.g., a Gaussian distribution, etc.) may be selected, from among a plurality of candidate functional form types (e.g., Gaussian distribution, Poisson distribution, etc.), to represent a probability distribution of a network optimization parameter for (a combination of) a network quality category and a time window. The specific functional form type may be used as a generative model.

Sufficient statistics of the probability distribution of the network optimization parameter may be obtained by estimating, predicting and fitting hyperfunction parameters of the specific functional form type or the generative model based on database records (or network traffic data records) for (the combination of) the network quality category and the time window.

Additionally, optionally or alternatively, other generative models (e.g., Gaussian mixture model, hidden Markov models, naive Bayes autoregressive models, variational autoencoders, generative adversarial networks, etc.) other than a specific functional form used to represent a probability distribution may be used. In some operational scenarios, neural networks may be used as generative models for inferring or estimating sufficient statistics and/or underlying probability distributions of network optimization parameters for (a combination of) a network quality category and a time window.

5. NETWORK QUALITY MONITORING AND OPTIMIZATION

In many operational scenarios, quality or performance of networks (e.g., 104 of FIG. 1A, etc.) depends on a variety of factors or contexts extrinsic to data values employed in network requests and/or data downloads and performance data associated with the network requests and/or data downloads. These factors or contexts may include, but are not necessarily limited to only, some of all of the following:
  mobile carrier;
  device settings, such as phone/browser;
  access network technology (which depends on network type such as LTE, 3/4/5 G, HSPA, quality of WiFi, etc.)
  autonomous systems to which user devices and/or application servers belong;
  real time network congestion handling and timeouts; etc.

Metadata about some or all of the factors and/or contexts affecting the quality or performance of the networks may or may not be available in many operational scenarios.

Techniques as described herein do not depend on acquisition of contextual metadata or information about these factors including but not limited to metadata about network technology or geographic locations (or network topology locations). There is no inherent need to implement the techniques as described herein in a way customized to specific network technologies, specific devices, specific CDNs, or specific content being requested or downloaded. Rather, these techniques may be implemented in a manner that makes use of (e.g., solely, substantially, etc.) already available network traffic data such as network request data, page load data, download outcomes, etc., that can be obtained in real time or as post download data, independent of or with no dependence on receiving information about underlying access service networks (or types thereof) whose service areas physically cover the user devices and about geographic and/or time zone locations of the user devices and/or the access service networks.

The "goodness" of network quality or performance most likely affects end user experiences of computer applications significantly. Just as the aforementioned factors or contexts in which network request are made are time variant/dependent, quality and performance of networks are also time variant/dependent. Thus network traffic data can be evaluated over time to capture and discern dynamic time variant nature of network performance and quality for the purpose of generating and applying best network optimization solutions adaptive to such dynamic time variant nature of network performance and quality, thereby improving end user experiences of various computer applications.

In some operational scenarios, generation/determination of network quality categories and sufficient statistics of probability distributions of network optimization parameters for respective network quality categories may be repeated (e.g., periodically, on demand, based on a schedule, etc.) over time. By way of example but not limitation, unsupervised learning operations to generate network quality categories and sufficient statistics may be periodically repeated every N hours, where N is configurable in a system (e.g., a network optimizer, a dynamic network performance monitor, etc.) as described herein.

Running unsupervised machine learning as described herein over time (e.g., periodically, etc.) or over a plurality of different time points (e.g., on a time schedule, etc.) to learn performance/quality related structures of the network traffic data enables the system to dynamically identify clusters, categories, segments, bands, etc., of various network qualities from the network traffic data without any presumption or contextual information about the performance and quality of access service networks involved and without any presumption and contextual information about whether the user devices are located in a good, ok or bad access networks. In addition, unsupervised machine learning can be enhanced and/or extended to further estimate sufficient statistics of probability distributions of network optimization parameters/quantities for network quality clusters/categories/segments/bands dynamically identified/determined from the network traffic data. Expected values or other statistics and/or their respective traffic shares can be readily estimated or derived using the sufficient statistics of the network optimization parameters. The network quality categories and their respective sufficient statistics can be used—e.g., in place of, or in lieu of, the factors and contexts not available—to add granularity to network traffic data as well as individual traffic data segments of the network traffic data being analyzed for generating the network optimization solutions.

As a result, dynamic time-dependent estimation of network quality categories over multiple time windows can be deduced or inferred from the network traffic data without assuming any stationarity of network quality categories or probability distributions for the network optimization parameters.

In some operational scenarios, network quality categories and/or sufficient statistics of probability distributions of network optimization parameters and/or expected values or other statistics along with their respective traffic shares, as generated through unsupervised machine learning as described herein, can be used for generating network optimization solutions/strategies/policies in scenarios in which metadata of factors and contexts such as network technology and location context information is not available.

In some operational scenarios, network quality mappings can be generated from individual data segments as partitioned or characterized by respective sufficient statistics and/or expected values and/or traffic shares in network quality categories and used to train a network optimizer such as an adaptive network optimization engine to generate network optimization policies for different network quality categories and/or for different data segments or different traffic shares or different sub data segments in a network quality category.

For example, based at least in part on expected values or other statistics and their respective traffic shares generated with the sufficient statistics, the adaptive network optimization engine may derive, estimate and/or predict optimized values of network or TCP parameters for individual data segments with the respective traffic shares. The optimized values of the network or TCP parameters may be propagated as a part of network optimization policies to user devices, content distribution network (CDN) nodes/servers, web servers, application servers, platform servers, backend servers, etc., to accelerate (future) network requests and/or (future) data downloads.

6. SYNTHETIC TRAFFIC DATA GENERATION

Figure 4B:
Figure 4B:
Figure 4B:

FIG. 4B illustrates an example process flow for generating simulated or synthetic network requests given input data 422. The performance flow may be implemented or performed by a network monitor, a performance optimizer, a performance tester, etc., implemented with one or more computing devices.

By way of illustration but not limitation, the input data 422 comprises a network quality category, a time window and a vector—corresponding to the network quality category and the time window—of sufficient statistics of one or more network optimization parameters. The vector of sufficient statistics may comprise one or more vector components respectively for the one or more network optimization parameters. Each vector component of the vector corresponds to a specific network optimization parameter in the one or more network optimization parameters. The one or more network optimization parameters may comprise sustained maximum transmit rate, maximum allowed burst and maximum latency of the network quality category for the time window.

Block 424 comprises sampling a set of specific values for the one or more network optimization parameters from a set of one or more probability distributions respectively for the one or more network optimization parameters. Each probability distribution in the set of one or more probability distributions corresponds to a respective network optimization parameter in the one or more network optimization parameters and is represented by a respective vector component (or respective sufficient statistics) in the vector of sufficient statistics. The set of specific values for the one or more network optimization parameters may correspond to a specific traffic share in a plurality of traffic shares that make up all traffic shares (or network requests and/or data downloads) for the network quality category and the time window.

Block 426 comprises simulating network requests and/or data downloads with the set of values for the set of network optimization parameters. For example, the set of values for the set of network optimization parameters may be used to derive specific values for network or TCP parameters using a generative model, using a network optimization function, and the like, that maps the network optimization parameters to corresponding network or TCP parameters. A network request simulator (e.g., 118 of FIG. 1A, a Linux system with "curl" calls, tc, CatchPoint, etc.) may be used to generate or simulate the network requests or to cause corresponding data downloads to occur. Using statistics logged with these network requests and corresponding data downloads, synthetic network traffic data such as synthetic network request data, synthetic page load data, synthetic download outcomes, etc., may be generated, collected, processed and/or stored. In some operational scenarios, the synthetic network traffic data may be collected using the same or similar mechanisms that are used to collect network traffic data in connection with network requests and/or data downloads originated from (non-simulating) user devices and/or from user interactions.

Synthetic network traffic data may be generated, collected and/or analyzed for dynamic performance evaluation purposes as well as dynamic performance optimization purposes. In an example, before a new or revised computer application is to be deployed in a specific environment for testing or production purposes, synthetic data may be collected by way of deploying or employing network request simulators 118 that issue or originate simulated network requests and/or corresponding data downloads. In another example, after probability distributions of network optimization parameters are derived, some regular cases as well as corner cases, fringe cases, outliers, etc., of the probability distribution may be validated or complemented through collecting network traffic data from simulated network requests and/or corresponding data downloads to ensure relatively high quality and high confidence of network optimization policies generated by a system as described herein. In a further example, (candidate) optimized values of network or TCP parameters may be validated through synthetic traffic data collected with synthetic network requests and/or data downloads made with the (candidate) optimized values of the network or TCP parameters, before the (candidate) optimized values of the network or TCP parameters are propagated to and implemented by user devices and/or network request servers in a production environment, in a development environment, etc. A computer system as described herein may be a large system that provides computer applications/services to a large population of users (e.g., end users, developers, custom service professionals, etc.) in production and/or development environments or system instances. In some operational scenarios, directly testing network performances of computer applications and network optimization policies or strategies in these environments may be relatively high risk and problematic. Techniques as described herein can be used to avoid or reduce such testing in the production and development environments or system instances.

A network request simulator—which may simulate or emulate a user device and/or another network element—may be implemented using Linux systems with curl, using a Linux kernel packet scheduler tc, using a traffic scenario simulator such as CatchPoint, and so forth. In some embodiments, a network request simulator as described herein may be implemented or hosted with an application container such as a docker container or a VM to simulate and collect traffic data corresponding to various network scenarios.

Synthetic traffic data as described herein may be used along with non-synthetic traffic data (e.g., actual user generated traffic data, etc.) as a part of building blocks of statistical modeling. Sufficient statistics derived at least in part from the synthetic traffic data may be used to adjust or adapt user devices, application servers, etc., to different network conditions/settings, in place of or in addition to adjusting or adapting the user devices, application services based on metadata information about access service network technology and location information of user devices. Synthetic traffic data may be used generate training instances used to train a machine learning system/algorithm without a priori ground truth or labels. Synthetic traffic data can also be used to avoid or reduce testing new systems, new features, etc., directly on a production system or a multi-user multi-group development system. Synthetic traffic data can be used to aid or enable modeling processes for identifying/validating performance characteristics of a new system, a new feature, etc. with a typical user population (e.g., a user population of a large custom organization hosted in a multitenant hosting system, etc.). Synthetic traffic data can also be collected to validate a new system, a new feature, a new network optimization strategy, etc., to see how the new system, the new feature, the new network optimization strategy, etc., works in different settings of network conditions, in different values of a network parameter, etc., in case statistical modeling with only past or historical data goes wrong. This can detect/avoid problems before they actually occur.

7. EXAMPLE NETWORK OPTIMIZER

FIG. 2 illustrates an example system that includes a network optimizer. The system or a module/component therein may be implemented in hardware, software, a combination of software and hardware, etc., with one or more computer devices. Some or all of the modules/components of the system may communicate over any combination of one or more of: the Internet; intranets, extranets, virtual private networks (VPNs), local area networks (LANs), wide area networks (WANs), wireless networks, wireline networks, client-server, mobile networks, public networks, carrier-class networks, access networks, enterprise networks, proprietary networks, or the like.

As illustrated in FIG. 2, a network optimizer 106 may include a (network) traffic data gatherer 202, a data aggregator 204, a heuristics engine 206, a (data) model generator 208, a (sufficient) statistics generator 222, a (data) tolerance adjustor 212, a machine learner 214, a (e.g., statistical, etc.) prediction generator 216, a performance data set store 218, and a (network) policy propagator 220, in one embodiment. The network optimizer 106 may communicate data over one or more networks 104 with other elements of system 100, such as user devices 102 and/or network request simulators 118, one or more application servers 108, data centers 110, and one or more network traffic data stores 112.

A network traffic data gatherer 202 may read, from a network traffic data store 112, one or more network data values associated with network requests (including but not limited to data requests) between network request origination devices such as user devices 102 and/or network request simulators 118 and data centers 110 through one or more application servers 108. In one embodiment, a network data value may be gathered by an agent 114 of a user device 102 and/or a network request simulator 118 or from an application server 108. The network traffic data gatherer 202 may retrieve network traffic data stored in one or more network traffic data stores 112 by the agent 114 or by the application server 108, in an embodiment.

A data aggregator 204 may retrieve raw network traffic data from the network traffic data stores. The data aggregator 204 can aggregate the raw network traffic data into aggregated rows over a period of time (e.g., a month, a week, a day, an hour, etc.) for each time window/block in the period of time. The aggregated rows are representative of the (e.g., mobile, user device originated, etc.) network traffic that is aimed for optimization. Each aggregated row becomes a data point with information on the "goodness" (e.g., "good", "ok", "bad", other network quality classifications/categories, etc.) for network requests and/or data downloads represented in the aggregated row for the time window.

A sufficient statistics generator 222 may generate individual sufficient statistics of network optimization parameters for each network quality category identified for a time block or window as described herein.

Network quality mappings may be generated from different network traffic buckets (e.g., of each network quality category, etc.) comprising subsets of the aggregated rows and stored as network performance dataset(s) in a network optimization data set store such as a performance data set store 218 of FIG. 2, and may be used as data points to train a machine, for example in a "supervised" way.

A heuristics engine 206 may incorporate knowledge known to administrators of the network optimizer 106. A heuristic is a technique, method, or set of rules designed for solving a problem more quickly when classic methods are too slow, or for finding an approximate solution when classic methods fail to find any exact solution. Here, the heuristics engine 206 may incorporate knowledge known to the designers of supervised learning methods and techniques described herein to estimate network parameters.

A data model generator 208 may generate one or more data models to estimate optimized values for some or all network or TCP parameters as described above. Given the possibility of network changes over time and the deterministic nature of identifying sets of optimal values for the network or TCP parameters using the aggregated rows or database records, the data model generator 208 may be used to identify an iterative process for a supervised learning algorithm/method to train a machine to achieve desired outputs.

In an example, a particular network quality category may have a maximum throughput of 50 MB/sec based on historical data. Thus, a transmission rate, a particular network or TCP parameter, may be throttled to a range of 20 to 30 MB/sec to ensure faster transmission and minimize the risk of packet loss. In another example, a particular web page may have data objects of different criticalities or elasticities. Usability and proper functioning of the particular web page may be ensured by adopting an order of download in which relatively critical data objects of the web page are downloaded first or by optimizing burst sizes and congestion handling based on the respective elasticities of the data objects in the web page. Example operations in connection with data object criticality can be found in U.S. patent application Ser. No. 16/775,834, with an application title of "CRITICAL PATH ESTIMATION FOR ACCELERATED AND OPTIMAL LOADING OF WEB PAGES" by Tejaswini Ganapathi, Kartikeya Chandrayana and Satish Raghunath, filed on Jan. 29, 2020, the entire contents of which are hereby incorporated by reference as if fully set forth herein. Example operations in connection with data object elasticity can be found in U.S. patent application Ser. No. 16/775,847, with an application title of "NETWORK REQUEST AND FILE TRANSFER PRIORITIZATION BASED ON TRAFFIC ELASTICITY" by Tejaswini Ganapathi, Satish Raghunath and Kartikeya Chandrayana, filed on Jan. 29, 2020, the entire contents of which are hereby incorporated by reference as if fully set forth herein.

A machine learner 214 may implement (e.g., unsupervised, supervised, etc.) machine learning algorithm/model, for example using a network performance dataset comprising the network quality mappings described above—which may be stored in the performance data set store 218—as training instances to train the machine learning algorithm/ model. The machine learner may be implemented with one or more computing devices.

A data tolerance adjustor 212 may ensure that an estimated (value for a) network or TCP parameter falls within a particular tolerance based on a type of the parameter. For discrete network or TCP parameter values, such as number of simultaneous network connections, the tolerance may be zero (0), for example. For continuous network or TCP parameter values, such as rate of transmission, the tolerance may be 10%, for example, in comparison with a black box optimization algorithm developed to retrieve or compute network or TCP parameters which maximized performance based on calculation of network statistics. The black box optimization algorithm may operate with an objective function, which may be a function of performance improvement in page load time, throughput, download complete time, network congestion, and other network performance characteristics/parameters. The optimization may be constrained or dependent on thresholds for performance improvement metrics and traffic share. The black box algorithm outputs a set of values for the network or TCP parameters which optimizes the objective function subject to the constraints. It operates on data aggregated—which may or may not be the same as a time window for which aggregated rows may be generated for training the machine for supervised learning— over some period of time (e.g., a few days, etc.) and has no memory in the choice of statistics used to calculate this objective function and is purely deterministic.

A statistical prediction generator 216 may be used to generate calculations used in statistical prediction, including probability distributions, Bayesian probability, moving averages, regression analysis, predictive modeling, and other statistical computations. The performance data set store 218 may be used to store training set data for generated data models. The performance data set store 218 may include a subset of data stored on the network traffic data store 112, in one embodiment.

A network optimization policy propagator 220 may deliver a network optimization policy to network request origination devices such as user devices 102 and/or network request simulators 118 and/or application servers 108. A network optimization policy may be chosen based on the above described techniques and may be propagated by configuring a network interface on a user device 102 through an agent 114 or configuring network traffic management on an application server 108 through an accelerator 116, in an embodiment. In other embodiments, the network optimization policy propagator 220 may send instructions to a user device 102 (and/or a network request simulator 118 in some operational scenarios) or an application server 108 on how to implement the chosen network optimization policy based on the estimated network TCP parameter(s).

8. ESTIMATING NETWORK QUALITY CATEGORIES

Figure 3A:
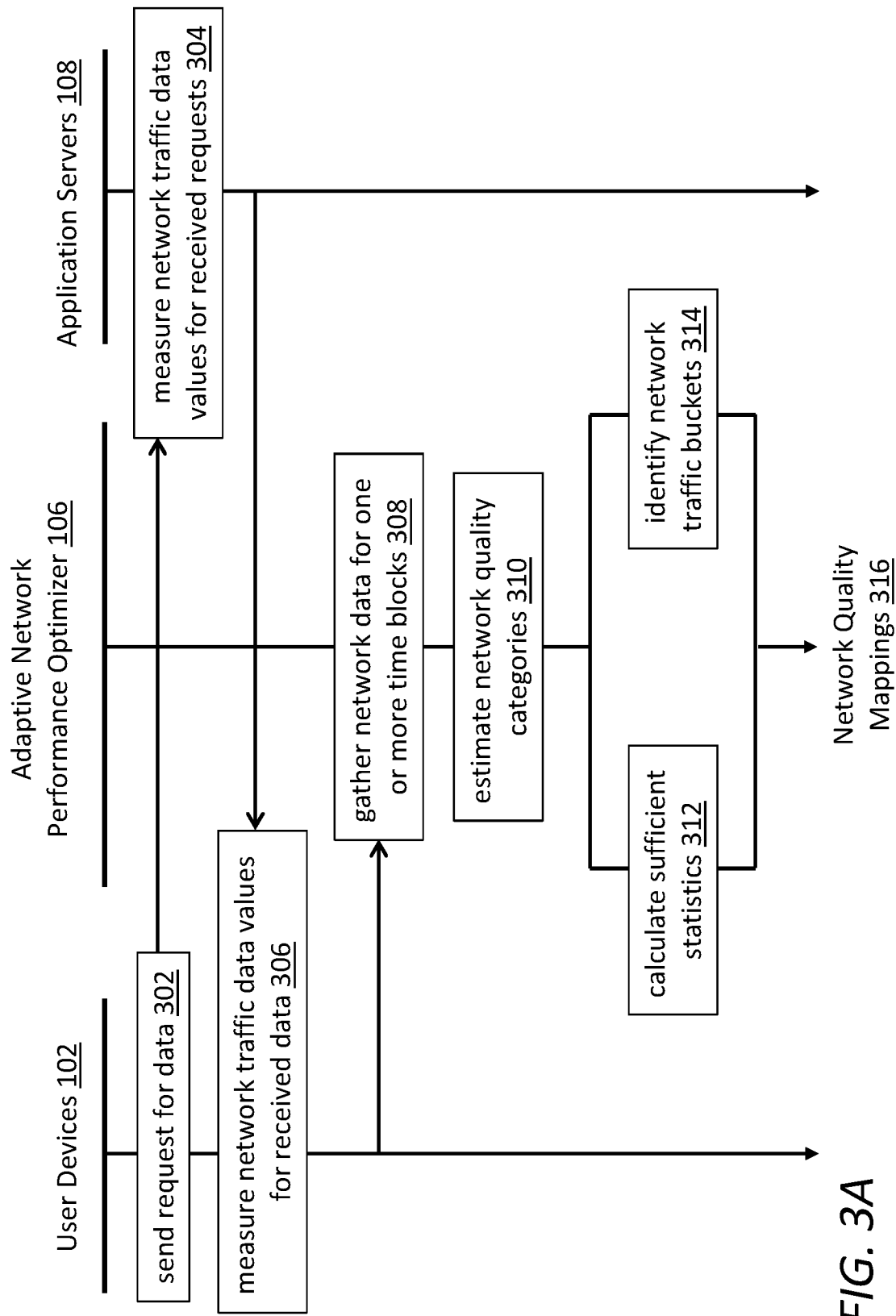
FIG. 3A illustrates an example process flow for estimating network quality categories.

FIG. 3A illustrates an example process flow for estimating network quality categories, extracting relevant information for network optimization, and generating network performance dataset(s) in the form of network quality mappings to drive a network optimizer as described herein, given network traffic data. In some embodiments, one or more computing devices or components may perform this process flow.

In some operational scenarios, the network quality categories are estimated repeatedly, for example every N hours, to make a system as described herein or the network optimizer therein, adaptive to changes in network(s) (e.g., 104 of FIG. 1A or FIG. 1B, etc.). Additionally, optionally or alternatively, in some operational scenarios, the network quality categories are estimated using bypass network requests operating in a "bypass" mode without network optimization in order to remove bias from any network optimization algorithms on download outcomes and perceived network qualities.

Block 302 comprises sending, by one or more network request origination devices such as user devices 102 and/or network request simulators 118, network requests for data or data objects of one or more web pages of one or more computer applications to one or more application servers 108.

Block 304 comprises, in response to receiving the network requests, measuring, by the application servers 108, network traffic data values for the received network requests.

Block 306 comprises, in response to receiving the data or data objects from the application servers 108, measuring, by the network request origination devices, raw network traffic data values for the received data or data objects as requested by the network requests. Such raw network traffic data values may include page load data, download outcomes, etc.

Block 308 comprises gathering, by a network optimizer 106, network traffic data comprising one or more network traffic data portions over one or more time blocks/windows. Each network traffic data portion in the one or more network traffic data portions may be gathered or collected for a respective time block/window in the one or more time blocks/windows.

In some operational scenarios, a network traffic data portion over a corresponding time block/window is partitioned into one or more different (traffic data) data segments corresponding to one or more different combinations of computer applications (e.g., "xyz-app-1", "xyz-app-2", etc.) and geographic or time zones (e.g., "us-west-1", "us-west-2", "us-east-1", "us-east-2", etc.) in which network request origination devices operating with the computer applications reside. Each data segment in the one or more data segments corresponds to a respective (e.g., unique, distinct, etc.) combination of a specific computer application and a specific geographic zone in the one or more combinations of computer applications and geographic zones.

Example computer applications as described herein may include, but are not necessarily limited to only, any of: standard computer applications provided by a multitenant hosting system to all customer organizations hosted in the multitenant hosting system; custom computer applications developed by respective hosted organizations; computer applications interacting with mobile applications and/or desktop applications; computer applications interacting with or providing web pages displayed with web browsers; and so forth.

Example geographic or time zones (or locations) may include, but are not necessarily limited to only, any of: Pacific Time Zone; Central Time Zone; Eastern Time Zone; regions of a continent; regions of a country; regions of a state or province; regions in which access service networks with their service areas physically covering the network request origination devices are located; regions with or in which closest application servers (of a provider of the computer applications) that process network requests in connection with the computer applications are deployed, and so forth.

The network optimizer 106 may filter the network traffic data (e.g., filtering each network traffic data portion in some or all of the data segments, etc.) to generate bypass network traffic data (e.g., generate a bypass network traffic data portion for each data segment in some or all of the data segments, etc.). In some operational scenarios, any network traffic data portion of the network traffic data that was accelerated with network optimization policies as described herein may be excluded or filtered out from the bypass network traffic data.

Bypass network traffic data provides a purest unbiased definition/representation for quality of networks, as samples or data points with accelerated performance may skew assessment of actual quality of networks. Some or all network requests and/or data download represented in the bypass network traffic may not go through a proxy service that implements network optimization strategies. These network requests and/or data downloads may be exchanged directly between network request origination devices and application servers. Additionally, optionally or alternatively, some or all network requests and/or data download represented in the bypass network traffic may go through a transparent proxy or a proxy operating in a transparent mode that does not implement network optimization strategies. Thus, network quality categories can be found by clustering aggregated rows or database records (representing measurement/sampling data points) in the bypass traffic data or a portion (e.g., a data segment, a sub data segment, etc.) therein.

Additionally, optionally or alternatively, in some operational scenarios, all of the network traffic data is considered or deemed as bypass network traffic data. For example, filtering to generate bypass traffic data may be turned off to include some or all of an entire population of network traffic including but not limited to accelerated traffic as bypass traffic. As a result, network quality categories may be generated with automatic clustering of aggregated rows or database records that include those of accelerated traffic.

A data segment comprising a bypass network traffic data portion as described herein may be represented as aggregated rows or database records. Each aggregated row or database record in the (bypass traffic) data segment may comprise (bypass traffic) data fields including but not limited to any, some or all of: a traffic share of network request(s) and/or data download(s) represented in the aggregated row or database record; one or more page load metrics for web page(s) comprising data or data objects as requested by the network request(s); one or more download outcomes of the requested data or data objects; an (e.g., individual, average, etc.) access round trip time (RTT) determined from arrival times of data packets representing the network request(s) and/or the data download(s) between network request origination device(s) making the network request(s) and closest (e.g., application, proxy, etc.) servers receiving the network requests(s); a source IP prefix (e.g., IPv4 prefix, IPv6 prefix, etc.) to which the network request origination device(s) belong; an autonomous system number or ASN of an autonomous system through which the network request origination device(s) access application servers and/or data centers and download or exchange data with the application servers and/or the data center; etc.

As used herein, an autonomous system (AS) may refer to a collection of connected Internet Protocol (IP) routing prefixes under the control of one or more network operators on behalf of a single administrative entity or domain that presents a common, clearly defined routing policy to the Internet. Instead of setting up a probably overbroad network optimization policy across all different autonomous system numbers, techniques as described herein can be used to generate individual customized network optimization strategies/policies for sub scopes or sub data segments that are at least partly distinguished by different combinations of computer applications, geographic or time zones of application servers processing network requests, IP prefixes, access RTTs, source IP prefixes, different ASNs, etc.

Block 310 comprises extracting, by the network optimizer 106, one or more network performance features from each aggregated row or database record in aggregated rows or database records of each data segment comprising a corresponding bypass traffic data portion over a time block/window. Using the one or more network performance features for each such aggregated row or database record, the network optimizer 106 generates or estimates one or more network quality categories through unsupervised learning. The one or more network quality categories comprise one or more (e.g., mutually exclusive, etc.) subsets collectively constituting the aggregated rows or database records of the data segment. Each network quality category in the one or more network quality categories corresponds to a respective subset in one or more (e.g., mutually exclusive, etc.) subsets of aggregated rows or database records in the data segment.

The one or more network performance features may be represented in a feature vector comprising one or more vector components each of which corresponds to a respective network performance feature in the one or more network performance features. The one or more network performance features may be one or more of: page load performance metrices, download outcomes, etc.

Block 312 comprises calculating respective sufficient statistics (e.g., a marginal probability distribution, parameters defining a marginal probability distribution, etc.) of each of network optimization parameters (e.g., sustained maximum transmit rate, maximum allowed burst, maximum latency, etc.) for each network performance category in one or more network performance categories determined for each data segment comprising a bypass traffic data portion over a time block/window. The network optimization parameters may be generated from the aggregated rows or database records using a generative model. In various embodiments, the respective sufficient statistics of each of the network optimization parameters may be calculated or determined using one or more of: maximum likelihood, best fitting of a type of probability distribution, neural networks, etc.

Block 314 comprises identifying, by the network optimizer 106, one or more traffic data buckets (including but not limited to their respective traffic shares) among some or all aggregated rows or database records in each network performance category in one or more network performance categories determined for each data segment comprising a bypass traffic data portion over a time block/window.

The one or more traffic data buckets may be identified or determined in the aggregated rows or database records of each such network performance category by a combination of data fields (or values thereof) of the aggregated rows or database records including but not limited to some or all of: one or more access RTT ranges, one or more source IP prefix(es), one or more ASN(s), etc. Additionally, optionally or alternatively, other data fields (or other values thereof) in the aggregated rows or database records may be used to identify or add granularity to traffic data buckets as described herein. Thus, each traffic data bucket in a network quality category for a time block/window as described herein represents a sub data segment of a data segment comprising the network traffic data portion of the network quality category for the time block/window.

The network optimizer 106 generates one or more network quality mappings from one or more traffic data buckets in each network performance category in one or more network performance categories determined for each data segment comprising a bypass traffic data portion over a time block/window. The one or more network quality mappings collectively represent a mapping from the network performance category to the one or more traffic data buckets in the network performance category.

For example, multiple network traffic buckets of respective combinations/values of data fields (source IP, access RTT, ASN) may be identified or generated for a single network quality category/band (e.g., "good", "ok", "bad", etc.) as described herein. The mapping from the network quality category/band to the multiple network traffic buckets is one to many. The system may take this into account by storing the one-to-many mapping, as generated by the process flow of FIG. 3A, in a network quality mapping data structure and use this one-to-many mapping to drive an intelligent adaptive network optimization engine.

As the network optimization engine can be trained for each dynamically generated network quality category with multiple dynamically generated network traffic buckets and/or network quality mappings, and as both network quality categories and network traffic buckets (and corresponding network quality mappings as training instances) can be determined intrinsically and dynamically from the network traffic data, the network optimization engine as described herein can operate without (dependence on) receiving metadata about access service network technology (e.g., metadata identifying WiFi, 3/4/5G, etc.) and/or without (dependence on) receiving geographic locations (e.g., other than geographic or time zones of application servers processing network requests, etc.) of network request origination devices. However, it should be noted that, in some operational scenarios, the network optimization engine can incorporate information/metadata on access service network technology and geographic locations of network request origination devices, if such information/metadata is available. Thus, techniques as described herein can be used to widen application scopes of network or TCP optimization policies/strategies to be used in a wide variety of application scenarios including but not limited to those application scenarios involving optimizing browser and mobile web traffic.

9. DRIVING NETWORK OPTIMIZATION

Figure 3B:
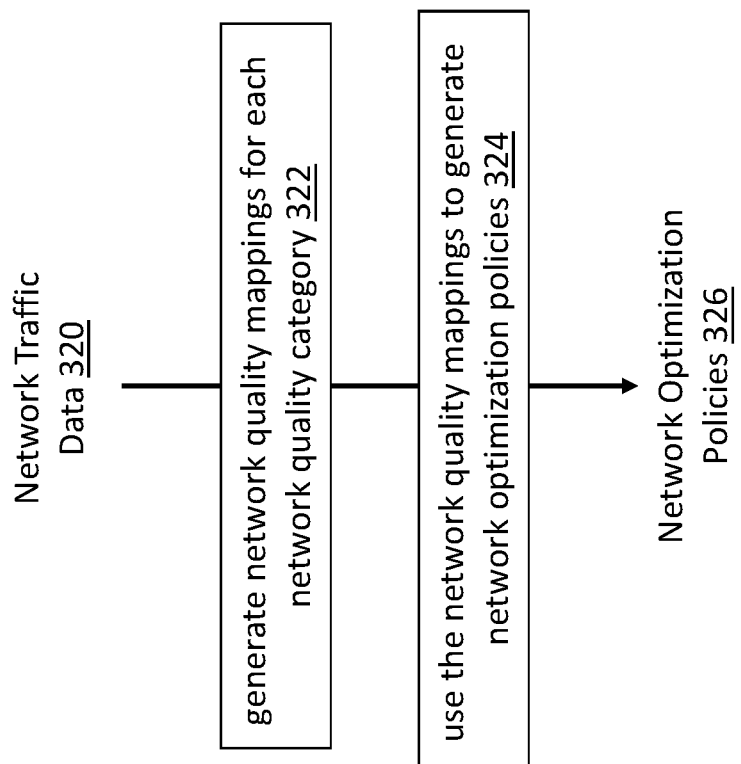
FIG. 3B illustrates an example process flow for driving a network optimization system with network quality mappings.

FIG. 3B illustrates an example process flow for driving a network optimization system with network quality mappings. These network quality mappings are derived from each of some or all data segments in network traffic data gathered for a time block/window.

Block 322 comprises receiving network traffic data 320 for a time block/window, applying unsupervised learning to identify network quality categories in the network traffic data 320, and generating network quality mappings (e.g., 308 of FIG. 3A, etc.) for each network quality category based on aggregated rows or database records representing data segment(s) and sub data segments in a respective network traffic data portion for the network quality category.

As previously mentioned, in some operational scenarios, a data segment may be identified by computer application (e.g., on a per computer application basis, on a per computer application type basis, etc.) and geographic or time zone (e.g., on a per time zone basis, on a per geographic zone basis, etc.) of application server(s) processing network requests in connection with computer applications. In some operational scenarios, a sub data segment may be further identified in a data segment by access RTT range (e.g., on a per RTT range basis, an RTT range of 0-50 milliseconds, an RTT range of 50-150 milliseconds, etc.), source IP prefix (e.g., on a per source IP prefix basis, a source IP prefix as determined from data packets sent by network request origination devices, etc.), ASN (e.g., on a per ASN basis, an autonomous system to which the network request origination devices belong or are designated, etc.), and so forth.

The network quality categories may be identified as clusters through unsupervised learning by applying automatic clustering to aggregated rows or database records in a data segment or a sub data segment as described herein. Sufficient statistics of network optimization parameters may be generated for a cluster of each network quality category using generative models.

Individual weights for individual clusters of respective network quality categories may be adjusted from initial weights (e.g., default weight values, initial weight values of one (1), etc.) using traffic shares as represented in the individual clusters. For example, these individual weights of the categories/clusters may be set to be proportional to respective the traffic shares of the categories/clusters. In some operational scenarios, original weights (e.g., one (1), etc.) of sub-categories or sub data segments in clusters or categories can be adjusted by multiplying with traffic shares of the sub-categories or sub data segments.

Similarly, individual weights for network traffic buckets or corresponding network quality mappings generated for a given network quality category or cluster may be adjusted from initial weights (e.g., default weight values, initial weight values of one (1), etc.) using traffic shares as represented in the network traffic buckets or corresponding network quality mappings. For example, these individual weights of the network traffic buckets or corresponding network quality mappings may be set to be proportional to respective the traffic shares of the buckets or mappings.

Block 324 comprises using the network quality mappings by the network optimization system as input to generate network optimization policies 326. Machine learning (e.g., supervised machine learning, unsupervised machine learning, etc.) may be applied for each network quality category by the network optimization system to generate the network optimization policies 326.

In some operational scenarios, each of some or all of the network optimization policies 326 may be generated by the network optimization system on a per sub data segment basis, as illustrated in FIG. 3C. A network optimization policy 326 such as illustrated in FIG. 3C may be propagated to some or all of: one or more accelerators (e.g., 116 of FIG. 1A, etc.), one or more application servers (e.g., 108 of FIG. 1A or FIG. 1B, etc.), one or more proxy servers, one or more network request origination devices (e.g., user device(s) 102 of FIG. 1A or FIG. 1B, network request simulator(s) 118 of FIG. 1A or FIG. 1B, etc.), one or more agents (e.g., 102 of FIG. 1A, etc.), one or more network/server elements involving in processing network requests and corresponding data downloads, etc. The network optimization policy 326 may be implemented individually or collectively by one or more of these recipient devices in new network requests and/or new data downloads originated or processed by the recipient devices of the network optimization policy.

A network optimization policy may comprise a number of network optimization strategies to be adaptively applied by a recipient device in real time or in near real time. As illustrated in FIG. 3C, a network optimization policy may provide one or more network optimization strategies respectively for one or more corresponding network performance categories such as "good", "ok", "bad", etc.

An accelerator as described herein may implement relatively fine-grain network optimization strategies adaptively. One network optimization strategy may not adapt to the nuances among some or all user devices.

In some operational scenarios, if a network quality category of network(s) (e.g., 104 of FIG. 1A or FIG. 1B, etc.) is predicted, determined and/or estimated to be "good" at a given time, network optimization parameters from a corresponding network optimization policy for the "good" network quality category may be retrieved and used by an accelerator as described herein to determine optimal values for network or TCP parameters.

If the network quality category of the network(s) is predicted, determined and/or estimated to be "ok" at a given time, network optimization parameters from a corresponding network optimization policy for the "ok" network quality category may be retrieved and used by the accelerator to determine optimal values for network or TCP parameters.

If the network quality category of the network(s) is predicted, determined and/or estimated to be "bad" at a given time, network optimization parameters from a corresponding network optimization policy for the "bad" network quality category may be retrieved and used by the accelerator to determine optimal values for network or TCP parameters.

In some operational scenarios, the network optimization parameters from the network optimization strategy may serve as upper bounds, averages, lower bounds, etc., in determining the optimal values for the network or TCP parameters. The network optimization parameters may be used to generate optimal values for network or TCP parameter to be integrated or implemented with TCP stacks of network request origination devices and/or network request processing elements, thereby performing traffic shaping on network connections, for example on a per network or TCP connection basis.

For example, a network optimization parameter like maximum burst size (in bytes) may be used by a network optimization system as an input condition for initial congestion window computation as well as subsequent congestion handling such that, at any point in time, the sender in a TCP connection will not exceed the maximum burst size.

In contrast, a TCP connection implemented without network optimization techniques as described herein may not have this optimal information represented by the maximum burst size starting from scratch for the TCP connection and is likely to be repeatedly and frequently penalized during the time period of the TCP connection in scenarios in which a burst size, an initial congestion window, threshold(s) used in congestion handling, etc., are set too large or exceeds the maximum burst size.

In some operational scenarios, as illustrated in FIG. 3C, a weight value may be assigned to a network optimization strategy as described herein. The weight value may be set in dependence to a traffic share represented by a network quality category in a data segment or a sub data segment. A network optimization policy may be applied in a way that takes into account traffic shares of different network quality categories.

By way of illustration but not limitation, in response to determining that a traffic share of a specific network quality category is predominant as compared with other network quality categories for the same data segment or for the same sub data segment, one or more recipient devices of the network optimization policy can implement a specific network optimization strategy (or network optimization parameters therein) associated with or for the specific network quality category more frequently, or as a default network optimization strategy when real time network quality cannot be (e.g., confidently, initially, beforehand, etc.) determined.

Some network optimization strategies may be too aggressive. Some user devices may work better with less aggressive network optimization parameters generated for the "ok" network quality category rather than with more aggressive network optimization parameters generated for the "good" network quality category.

A network optimization solution as described herein can be extended to operational scenarios in which there are no or few accelerated network requests. Additionally, optionally or alternatively, the solution can be extended to operational scenarios in which some or all page load performance data, download outcomes (e.g., time to first byte, etc.), etc., are not collected. In these operational scenarios, other performance metrics/variables such as round trip times (RTTs), inter-packet gaps, and so forth, that are affected by and/or indicative of network quality may be used—e.g., in lieu of those not collected, not available and/or not used—to perform clustering or generating network quality catalogs as described herein. Page load performance, download outcomes, etc., are expected to depend on RTTs such as access RTTs from network request origination devices to edges of application service networks (e.g., of a multitenant hosting system, etc.).

Some or all techniques as described herein can be implemented and/or performed in a manner that is completely data driven with no or minimal human input. Such techniques may include, but are not limited to only, deciding granularity of data segments or sub data segments on which network optimization is to be performed to generate corresponding network optimization policies. Additionally, optionally or alternatively, some or all techniques as described herein can be implemented and/or performed without requiring or receiving metadata information on access network technology, such as WiFi, 3/4/5G, LTE, etc., and/or without requiring or receiving geographic or time zone information from (e.g., geolocational capability) of user devices such as mobile phones.

A network optimization system as described herein can implement an autonomous, adaptive and intelligent network optimization solution through unsupervised and/or supervised machine learning. The system automatically adapts to real-time or near-real-time network quality through recalculating or re-generating network quality categories repeatedly, for example every N units of time, thereby providing an autonomous, adaptive and intelligent end-to-end solution that is able to function with no or minimum intervention and/or metadata information other than those already inherently available in network traffic data. The end-to-end solution can provide network optimization policies/strategies to be implemented by user devices operated by end users and/or by origin servers that provide web-based computer applications/services to the user devices and/or other servers/nodes (e.g., edge nodes, cache servers, etc.) between the user devices and the origin servers.

10. EXAMPLE EMBODIMENTS

Figure 4C:
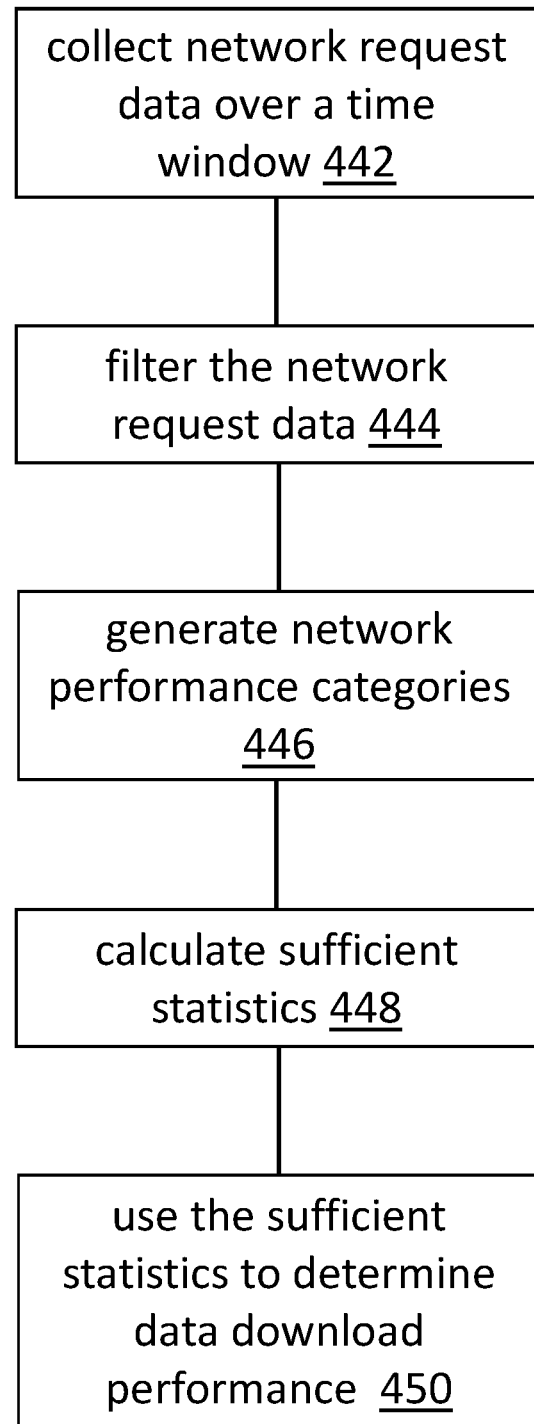

FIG. 4C illustrates an example process flow that may be implemented by a computing system (or device) as described herein. In block 442, a system as described herein collects network request data over a time window for a web application that communicates with user devices from different access networks over a plurality of application servers located at a plurality of different geographic locations.

In block 444, the system filters the network request data to generate a plurality of bypass network traffic records for the time window. Each bypass network traffic record in the plurality of bypass network traffic records comprises one or more download outcomes.

In block 446, the system generates (e.g., through unsupervised machine learning, etc.) a plurality of network performance categories from the plurality of bypass network traffic records. Each network performance category in the plurality of network performance categories comprises a respective subset of bypass network traffic records in a plurality of subsets of bypass network traffic records. The plurality of subsets of bypass network traffic records collectively aggregates to the plurality of bypass network traffic records.

In block 448, the system calculates a plurality of sets of sufficient statistics of network optimization parameters for the plurality of network performance categories. Each set of sufficient statistics of the network optimization parameters is calculated based on a respective subset of bypass network traffic records in the plurality of subsets of bypass network traffic records.

In block 450, the system causes the plurality of sets of sufficient statistics of the network optimization parameters to be used to improve network communication performance of one or more web applications.

In an embodiment, the one or more web applications are different from the web application.

In an embodiment, the one or more web applications include the web application.

In an embodiment, the data download performances of the one or more web applications are determined with simulated network requests using sampled values of the network optimization parameters generated from the sufficient statistics of the network optimization parameters.

In an embodiment, the network performance categories are generated through automatic clustering one or more features extracted from the plurality of bypass network traffic records for the time window.

In an embodiment, the one or more features comprise one or more of: one or more page load performance metrics, one or more download outcomes, or one or more access round trip times.

In an embodiment, the sufficient statistics are generated with one or more generative models.

Figure 4D:
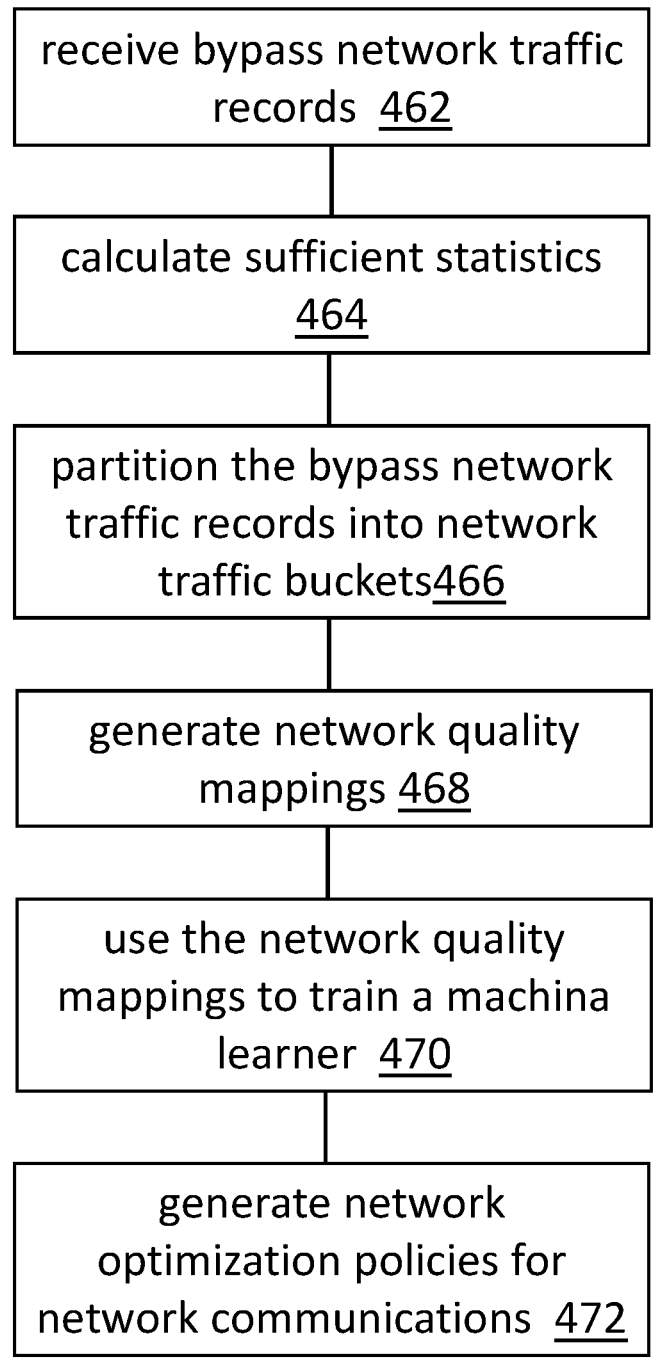

FIG. 4D illustrates an example process flow that may be implemented by a computing system (or device) as described herein. In block 462, a system as described herein receives a plurality of bypass network traffic records for a web application that communicates with user devices from a plurality of different access networks in a time window over a plurality of application servers located at a plurality of different geographic locations.

The plurality of bypass network traffic records is clustered into a plurality of network performance categories. Each network performance category in the plurality of network performance categories comprises a respective subset of bypass network traffic records in the plurality of bypass network traffic records.

In block 464, the system calculates a plurality of sets of sufficient statistics of one or more network optimization parameters for the plurality of network performance categories. Each set of sufficient statistics of the one or more network optimization parameters is calculated for a corresponding network performance category based on its respective subset of bypass network traffic records.

In block 466, the system partitions the respective subset of bypass network traffic records for the corresponding network performance category into one or more network traffic buckets, thereby generating a plurality of network traffic buckets for the plurality of network performance categories.

In block 468, the system generates, from the plurality of sets of sufficient statistics and the plurality of network traffic buckets, a plurality of network quality mappings.

In block 470, the system uses the plurality of network quality mappings as training instances to train a machine learner for generating network optimization policies.

In block 472, the system causes the one or more network optimization policies generated by the machine learner to be propagated to one or more user devices to be implemented by the one or more user devices in making network requests to the web application.

In an embodiment, each network quality mapping in the plurality of network quality mappings is weighed by a respective traffic share represented in a network traffic bucket used to generate the network quality mapping.

In an embodiment, expected values of the network optimization parameters are generated from the sufficient statistics of the network optimization parameters to be used as optimized values of the network optimization parameters.

In an embodiment, the sufficient statistics of the network optimization parameters are used to generate optimized values of the network optimization parameters, which may be other than expected values of the network optimization parameters generated from the sufficient statistics of the network optimization parameters.

In an embodiment, the plurality of network quality mappings is derived from the network traffic data intrinsically with no dependence on information about (a) network access technologies used by the user devices and (b) locations of the user devices.

In an embodiment, the plurality of bypass network traffic records for the web application is free of network traffic records for accelerated network requests and accelerated data downloads.

In an embodiment, the plurality of bypass network traffic records for the web application further includes network traffic records for accelerated network requests and accelerated data downloads.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

11. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
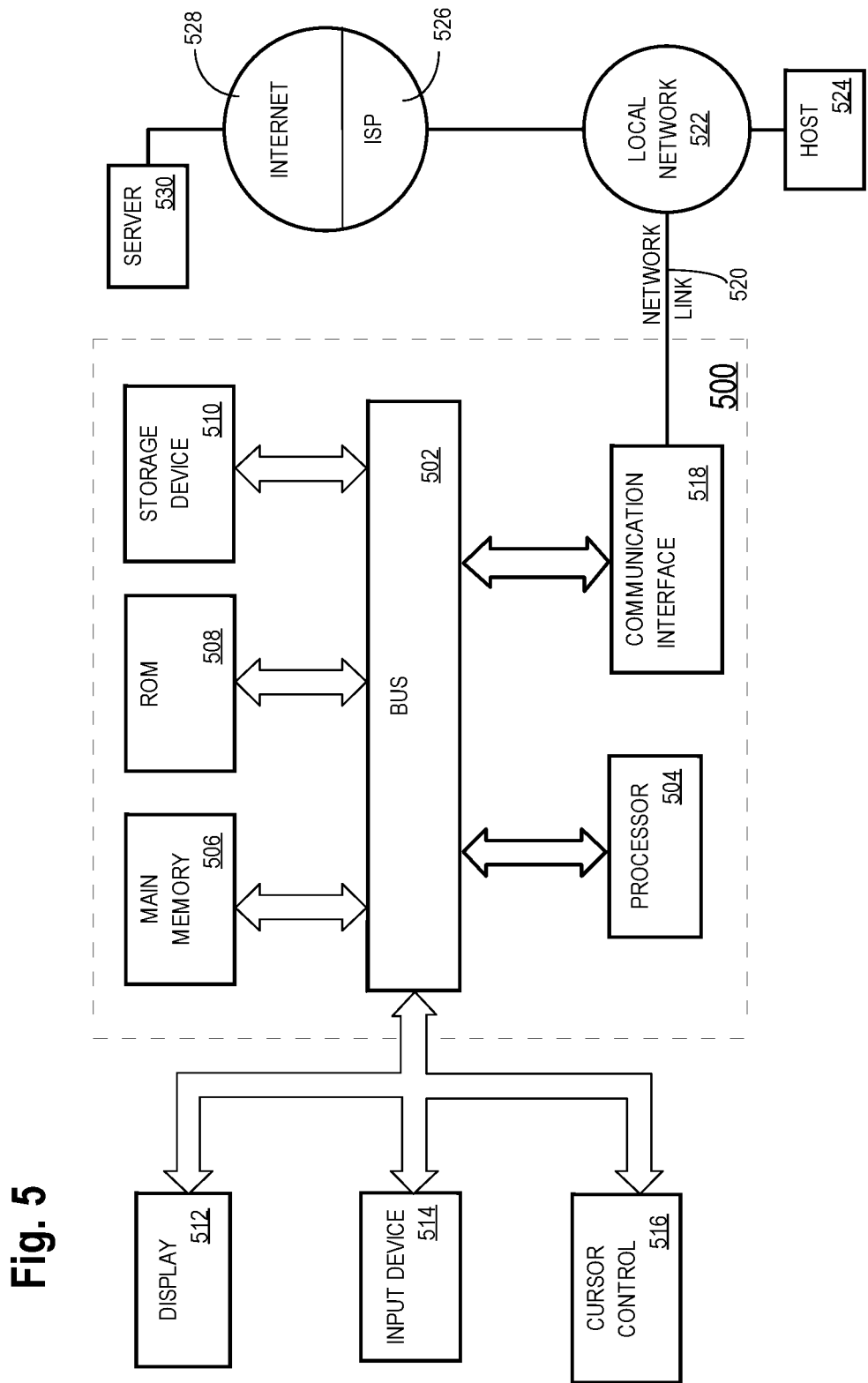
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

12. EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   receiving, by one or more computing devices, a plurality of bypass network traffic records for a web application that communicates with user devices from a plurality of different access networks in a time window over a plurality of application servers located at a plurality of different geographic locations, wherein the plurality of bypass network traffic records is generated from network traffic data devoid of information about (a) network access technologies used by the user devices and (b) locations of the user devices;
   wherein the plurality of bypass network traffic records is clustered into a plurality of network performance categories, wherein each network performance category in the plurality of network performance categories comprises a respective subset of bypass network traffic records in the plurality of bypass network traffic records;
   calculating, by the one or more computing devices, a plurality of sets of sufficient statistics of one or more network optimization parameters for the plurality of network performance categories, wherein each set of sufficient statistics of the one or more network optimization parameters is calculated for a corresponding network performance category based on its respective subset of bypass network traffic records;
   partitioning, by the one or more computing devices, the respective subset of bypass network traffic records for the corresponding network performance category into one or more network traffic buckets, thereby generating a plurality of network traffic buckets for the plurality of network performance categories;
   generating, from the plurality of sets of sufficient statistics and the plurality of network traffic buckets, a plurality of network quality mappings;
   using the plurality of network quality mappings as training instances to train a machine learner for generating network optimization policies; and
   causing the one or more network optimization policies generated by the machine learner to be propagated to one or more user devices to be implemented by the one or more user devices in making network requests to the web application.

2. The method as recited in claim 1, wherein each network quality mapping in the plurality of network quality mappings is weighed by a respective traffic share represented in a network traffic bucket used to generate the network quality mapping.

3. The method as recited in claim 1, wherein expected values of the network optimization parameters are generated from the sufficient statistics of the network optimization parameters to be used as optimized values of the network optimization parameters.

4. The method as recited in claim 1, wherein the sufficient statistics of the network optimization parameters are used to generate optimized values of the network optimization parameters.

5. The method as recited in claim 1, wherein the plurality of network quality mappings is derived from the network traffic data intrinsically with no dependence on information about (a) network access technologies used by the user devices and (b) locations of the user devices.

6. The method as recited in claim 1, wherein the plurality of bypass network traffic records for the web application is free of network traffic records for accelerated network requests and accelerated data downloads.

7. The method as recited in claim 1, wherein the plurality of bypass network traffic records for the web application further includes network traffic records for accelerated network requests and accelerated data downloads.

8. A non-transitory computer readable medium storing a program of instructions that is executable by a device to perform a method, the method comprising:
receiving, by a computing device implementing unsupervised machine learning, a plurality of bypass network traffic records for a web application that communicates with user devices from a plurality of different access networks in a time window over a plurality of application servers located at a plurality of different geographic locations, wherein the plurality of bypass network traffic records is generated from network traffic data devoid of information about (a) network access technologies used by the user devices and (b) locations of the user devices;
wherein the plurality of bypass network traffic records is clustered into a plurality of network performance categories, wherein each network performance category in the plurality of network performance categories comprises a respective subset of bypass network traffic records in the plurality of bypass network traffic records;
calculating, using a sufficient statistics generator implemented by the computing device, a plurality of sets of sufficient statistics of one or more network optimization parameters for the plurality of network performance categories, wherein each set of sufficient statistics of the one or more network optimization parameters is calculated for a corresponding network performance category based on its respective subset of bypass network traffic records;
partitioning, using a data aggregator implemented by the computing device, the respective subset of bypass network traffic records for the corresponding network performance category into one or more network traffic buckets, thereby generating a plurality of network traffic buckets for the plurality of network performance categories;
generating, from the plurality of sets of sufficient statistics and the plurality of network traffic buckets, a plurality of network quality mappings;
using the plurality of network quality mappings as training instances to train a machine learner for generating network optimization policies; and
causing the one or more network optimization policies generated by the machine learner to be propagated to one or more user devices to be implemented by the one or more user devices in making network requests to the web application.

9. The non-transitory computer readable medium as recited in claim 8, wherein each network quality mapping in the plurality of network quality mappings is weighed by a respective traffic share represented in a network traffic bucket used to generate the network quality mapping.

10. The non-transitory computer readable medium as recited in claim 8, wherein expected values of the network optimization parameters are generated from the sufficient statistics of the network optimization parameters to be used as optimized values of the network optimization parameters.

11. The non-transitory computer readable medium as recited in claim 8, wherein the sufficient statistics of the network optimization parameters are used to generate optimized values of the network optimization parameters.

12. The non-transitory computer readable medium as recited in claim 8, wherein the plurality of network quality mappings is derived from the network traffic data intrinsically with no dependence on information about (a) network access technologies used by the user devices and (b) locations of the user devices.

13. The non-transitory computer readable medium as recited in claim 8, wherein the plurality of bypass network traffic records for the web application is free of network traffic records for accelerated network requests and accelerated data downloads.

14. The non-transitory computer readable medium as recited in claim 8, wherein the plurality of bypass network traffic records for the web application further includes network traffic records for accelerated network requests and accelerated data downloads.

15. An apparatus, comprising:
one or more computing devices;
a non-transitory computer readable medium storing a program of instructions that is executable by the one or more computing devices to perform a method, the method comprising:
receiving a plurality of bypass network traffic records for a web application that communicates with user devices from a plurality of different access networks in a time window over a plurality of application servers located at a plurality of different geographic locations, wherein the plurality of bypass network traffic records is generated from network traffic data devoid of information about (a) network access technologies used by the user devices and (b) locations of the user devices;
wherein the plurality of bypass network traffic records is clustered into a plurality of network performance categories, wherein each network performance category in the plurality of network performance categories comprises a respective subset of bypass network traffic records in the plurality of bypass network traffic records;
calculating a plurality of sets of sufficient statistics of one or more network optimization parameters for the plurality of network performance categories, wherein each set of sufficient statistics of the one or more network optimization parameters is calculated for a corresponding network performance category based on its respective subset of bypass network traffic records;
partitioning the respective subset of bypass network traffic records for the corresponding network performance category into one or more network traffic buckets, thereby generating a plurality of network traffic buckets for the plurality of network performance categories;

generating, from the plurality of sets of sufficient statistics and the plurality of network traffic buckets, a plurality of network quality mappings;

using the plurality of network quality mappings as training instances to train a machine learner for generating network optimization policies; and causing the one or more network optimization policies generated by the machine learner to be propagated to one or more user devices to be implemented by the one or more user devices in making network requests to the web application.

16. The apparatus as recited in claim 15, wherein each network quality mapping in the plurality of network quality mappings is weighed by a respective traffic share represented in a network traffic bucket used to generate the network quality mapping.

17. The apparatus as recited in claim 15, wherein expected values of the network optimization parameters are generated from the sufficient statistics of the network optimization parameters to be used as optimized values of the network optimization parameters.

18. The apparatus as recited in claim 15, wherein the sufficient statistics of the network optimization parameters are used to generate optimized values of the network optimization parameters.

19. The apparatus as recited in claim 15, wherein the plurality of network quality mappings is derived from the network traffic data intrinsically with no dependence on information about (a) network access technologies used by the user devices and (b) locations of the user devices.

20. The apparatus as recited in claim 15, wherein the plurality of bypass network traffic records for the web application is free of network traffic records for accelerated network requests and accelerated data downloads.

21. The apparatus as recited in claim 15, wherein the plurality of bypass network traffic records for the web application further includes network traffic records for accelerated network requests and accelerated data downloads.

\* \* \* \* \*